US012270169B2

(12) United States Patent
Vanderheggen et al.

(10) Patent No.: US 12,270,169 B2
(45) Date of Patent: Apr. 8, 2025

(54) METHOD FOR DETERMINING A CRANE OR CANTILEVER OPERATIONS ENVELOPE ON A JACK-UP PLATFORM UNIT, JACK-UP PLATFORM UNIT

(71) Applicant: GustoMSC B.V., Schiedam (NL)

(72) Inventors: Kayo Vanderheggen, Rotterdam (NL); Frederik Vanhee, Putte (NL)

(73) Assignee: GustoMSC B.V., Schiedam (NL)

( * ) Notice: Subject to any disclaimer, the term of this patent is extended or adjusted under 35 U.S.C. 154(b) by 0 days.

(21) Appl. No.: 17/690,620

(22) PCT Filed: Sep. 11, 2020

(86) PCT No.: PCT/NL2020/050563
§ 371 (c)(1),
(2) Date: Mar. 9, 2022

(87) PCT Pub. No.: WO2021/049937
PCT Pub. Date: Mar. 18, 2021

(65) Prior Publication Data
US 2024/0043251 A1    Feb. 8, 2024

(30) Foreign Application Priority Data

Sep. 13, 2019    (NL) .................................... 2023832

(51) Int. Cl.
*B66C 23/90*    (2006.01)
*B66C 13/16*    (2006.01)
*E02B 17/02*    (2006.01)
*E02B 17/00*    (2006.01)

(52) U.S. Cl.
CPC ............ *E02B 17/021* (2013.01); *B66C 13/16* (2013.01); *E02B 2017/006* (2013.01)

(58) Field of Classification Search
CPC .. E02B 17/021; E02B 2017/006; E02B 17/08; E02B 17/0818; E02B 2017/0082; B66C 13/16; B66C 23/90; B66C 23/52; Y02E 10/727; B66F 3/02; G01B 5/30
See application file for complete search history.

(56) References Cited

U.S. PATENT DOCUMENTS

| 4,482,272 A | * | 11/1984 | Colin | .................... E02B 17/024 |
| | | | | 405/196 |
| 4,735,526 A | * | 4/1988 | Kawagoe | .................. G01S 5/18 |
| | | | | 405/226 |
| 5,855,455 A | * | 1/1999 | Williford | .............. E02B 17/021 |
| | | | | 405/209 |

(Continued)

FOREIGN PATENT DOCUMENTS

CN    102556866 A    7/2012

OTHER PUBLICATIONS

International Search Report and Written Opinion—PCT/NL2020/050563—mailing date Nov. 9, 2020.

*Primary Examiner* — Edwin J Toledo-Duran
(74) *Attorney, Agent, or Firm* — Banner & Witcoff, Ltd.

(57) ABSTRACT

A method is provided for determining an actual achieved pre-load value by monitoring a leg load characteristic during pre-loading. The method further comprises determining an actual crane or cantilever operations envelope taking into account the actual achieved preload instead. The method further comprises taking into account other data such as environmental loads or crane or cantilever movement.

17 Claims, 9 Drawing Sheets

(56) References Cited

U.S. PATENT DOCUMENTS

| | | | |
|---|---|---|---|
| 6,257,165 B1* | 7/2001 | Danos, Jr. | B63B 35/44 |
| | | | 405/196 |
| 6,516,749 B1* | 2/2003 | Salasidis | A61D 7/00 |
| | | | 119/421 |
| 7,186,061 B2* | 3/2007 | Foo | E02B 17/06 |
| | | | 405/196 |
| 2002/0114668 A1* | 8/2002 | Legleux | E02B 17/0818 |
| | | | 405/3 |
| 2003/0053868 A1* | 3/2003 | Wetch | E21B 19/004 |
| | | | 405/224.2 |
| 2006/0062637 A1* | 3/2006 | Foo | E02B 17/06 |
| | | | 405/198 |
| 2006/0082079 A1* | 4/2006 | Eichhorn | B60S 9/12 |
| | | | 280/6.155 |
| 2008/0237174 A1* | 10/2008 | Altman | B66C 23/52 |
| | | | 212/347 |
| 2008/0289876 A1 | 11/2008 | King et al. | |
| 2009/0090191 A1* | 4/2009 | Lenders | E02B 17/0818 |
| | | | 73/786 |
| 2009/0297276 A1* | 12/2009 | Foo | B63B 21/27 |
| | | | 405/207 |
| 2010/0000143 A1* | 1/2010 | Pekin | A01K 97/125 |
| | | | 242/316 |
| 2012/0050056 A1* | 3/2012 | Lenders | E02B 17/0818 |
| | | | 340/665 |
| 2014/0147216 A1* | 5/2014 | Stephens | E02B 17/02 |
| | | | 405/196 |
| 2014/0366792 A1* | 12/2014 | Steven | E02B 17/021 |
| | | | 114/264 |
| 2015/0241299 A1* | 8/2015 | Deckers | E02B 17/0818 |
| | | | 73/786 |
| 2017/0175457 A1 | 6/2017 | Stanghelle et al. | |
| 2017/0217737 A1 | 8/2017 | Rudy et al. | |
| 2018/0001976 A1 | 1/2018 | Serena et al. | |
| 2019/0002250 A1* | 1/2019 | Willim | B66C 13/16 |
| 2019/0078280 A1* | 3/2019 | Rutgers | E02B 17/08 |
| 2019/0257052 A1* | 8/2019 | Janik | E02B 17/021 |
| 2019/0322338 A1* | 10/2019 | Stroo | E02B 17/021 |
| 2021/0372070 A1* | 12/2021 | Hofman | E02B 17/021 |

\* cited by examiner

FIG. 8a engineered crane curve - fixed-fixed full A2

Fv_psa = 5399 t
Fv_psf = 4053 t
Fv_sbf = 4170 t
Fv_sba = 3879 t 300 302
302
303 605
606a
606

Fv_psa inital = 4250 t
Fv_psf inital = 4250 t
Fv_sbf inital = 4250 t
Fv_sba inital = 4250 t

FIG. 8b

METHOD FOR DETERMINING A CRANE OR CANTILEVER OPERATIONS ENVELOPE ON A JACK-UP PLATFORM UNIT, JACK-UP PLATFORM UNIT

CROSS-REFERENCE TO RELATED APPLICATIONS

This application is a U.S. National Stage application under 35 U.S.C. § 371 of International Application PCT/NL2020/050563 (published as WO 2021/049937 A1), filed Sep. 11, 2020, which claims the benefit of priority to Application NL 2023832, filed Sep. 13, 2019. Benefit of the filing date of these prior applications is hereby claimed. Each of these prior applications is hereby incorporated by reference in its entirety.

The invention relates to a jack-up vessel having mission equipment mounted onto its deck. The mission equipment can be at least one crane or a cantilever. The crane can be mounted on the jack-up platform unit and can be movable with respect to the deck, for example, the crane boom angle and/or outreach varies during operation. The crane can be mounted for example on the deck, around a leg, on a jackhouse, etc. The cantilever can be movably mounted onto the deck, it can be for example movable between an extended position wherein the cantilever extends substantially outwardly of the deck and a retracted position in which the cantilever is substantially on the deck.

Jack-up platform units or jack-up vessels are well known and usually comprise a buoyant hull and a plurality of movable legs. The legs are movable with respect to the hull and are extendible through the hull. Typically, a jack-up platform unit may have three, four or six legs. The legs are adjustable between a sailing position in which the legs extend substantially above the hull. In the sailing position of the legs, the hull is floating on the water, and the platform unit can be displaced from one site to another. The legs can further be adjusted to an installation position in which the legs extend substantially below the hull and the hull is on or just above the water level. In that position, the legs are in contact with the sea bottom and rest on and/or in the sea bottom. In a further position, the operational position, the legs extend substantially below the hull and are fixed to the sea bottom, while the hull is raised above the water level to an operational level to allow sufficient gap between the water level and the hull bottom for, in particular, waves to pass underneath. The legs are moved with respect to the hull by a Jacking system.

Such jack-up platform unit can be self-sailing or self-propelled, but can be towed as well. A jack-up platform unit is often used for offshore operations, for example for drilling operations, maintenance operations, or wind turbine installation operations. A jack-up platform unit is often provided with a crane for hoisting and/or installation operations, e.g. mounted around one of its legs.

In the installation position of the jack-up platform unit, the legs are lowered to the seabed and need to be firmly installed to the sea bed, such that the jack-up platform in operational position is stable and firmly positioned to allow operations in a safe manner. To firmly ground the legs to the seabottom, it is common practice to apply a relatively high load, for example of some thousands of tons, to each of the legs in turns, for example individually or in pairs, while the other legs remain only slightly loaded, which procedure is often referred to as 'preloading'.

Various preloading procedures are possible, the most common used are active preloading or passive preloading, but a mix of active and passive preloading is also possible. With active preloading, a set force is continuously applied onto the leg during a predetermined time interval. The application of the active load is repeated until the jacking operator is of the opinion, given his experience and expertise, that the leg is sufficiently settled and the foundation is stable. With passive preloading, a force is applied onto the leg in a discrete manner, as opposed to continuously in the active procedure. The discrete force is repeatedly applied until the jacking operator considers the foundation to be sufficiently stable, given his experience and expertise. There is only relied upon expert knowledge and human judgment of the jacking operator to determine whether the foundation is stable and what the value of the preload is. There is no reproducible determination of the preload value.

It is the jacking operator who is responsible for the preloading operation and to guard that a sufficient pre-load is provided on the legs and that a stable foundation of the platform unit is obtained. After this preloading step, the hull is further raised to a desired operational elevation above the sea surface, for example to a height of more or less 10 to 15 m above the sea surface, which substantially avoids the hull being continuously hit by waves. Before or after further raising the hull, the load on the legs may be substantially equalized or levelled. In this way, it is thought that a relatively stable platform position is established from which operations can be executed almost independently of current and/or wave action.

During operations, operators such as a crane operator or a cantilever operator, rely upon pre-established procedures and plans, such as a lifting plan or a cantilever plan or a deck loading plan, and trust that operations can be done safely without jeopardizing the stability of the platform unit when the pre-load value is not exceeded during operations.

In particular for offshore wind turbine installations, when a platform is frequently jacked up and down at consecutive construction sited, time can be constraint and operators may not wait sufficiently long to see whether the applied load settles to a stable value or not. The safety on which the offshore operations on the jack-up platform unit rely is thus determined by the skills of the jacking operator.

Moreover, in particular on jack-up platform units used for wind turbine installation operations, a crane is provided on the jack-up platform unit, e.g. around one of the legs, for lifting and/or hoisting operations. The maximum crane capacity is defined by the crane characteristics and laid down in a crane operations manual. The crane operator makes sure to operate the crane within its defined boundaries. He therefore uses the pre-load value the jacking operator has given him. For some jack-ups, an operator may, by its operations, overload the legs although he didn't exceed the pre-load value received from the jacking system operator. This may jeopardize the safety and stability of the platform unit. For example, this may result in extra, uncontrolled settlement of the leg in the seabottom, or punch through, and/or collapse of the crane or even loss of the platform unit. Thus, it may happen that the crane operator sometimes has too much safety margin left on his operations, but may have too little safety margin on other operations. This leads to a safety risk during operations of the jack-up platform unit and/or unused capacity of the crane.

Therefor, there is a need for more safe and reliable operations on an offshore jack-up platform unit.

To that end, there is provided a method for determining a crane or cantilever operations envelope of a crane or cantilever mounted on a jack-up platform unit according to claim 1.

The method comprises applying a pre-load to at least one leg of the jack-up platform unit; monitoring at least one characteristic of the said leg, such as leg load value and/or leg penetration value, during a predetermined time interval; monitoring the leg characteristic and/or a gradient of the leg characteristic during said time interval; evaluate whether the leg characteristic is stable during said time interval; repeating the above steps until during the said time interval the leg characteristic is stable whereby the leg characteristic remains within the predetermined threshold and the gradient of the leg characteristic remains within the predetermined limit; wherein the value of the actual achieved pre-load is the leg load value associated with the thus achieved stable leg characteristic; determining an actual crane or cantilever operations envelope by calculating, per leg, the leg load capacity based on the actual achieved pre-load value and translating the calculated leg load capacity to a crane or cantilever operations capacity.

Advantageously, determining the crane or cantilever operations capacity is done in function of crane or cantilever movement, crane or cantilever loading, e.g. hoist loading or deck loading, environmental loads, crane or cantilever outreach etc. All these parameters may be together or individually taken into account when determining the crane or cantilever operations capacity by translating the calculated leg load capacity into a crane or cantilever operations capacity.

A leg load value can be considered the value of the load on the leg, and can for example be monitored via the jacking system. Of course, different jacking systems, hydraulic, rack-and-pinion or electric, have different means of applying and monitoring leg load value, either directly or indirectly. A leg penetration can be considered the depth that the leg has penetrated the seabed. It can also be referred to as leg settlement or leg displacement and can be monitored directly or indirectly in various ways, e.g. by measuring the displacement of the leg with respect to the hull and by measuring the distance between the hull and the sea bottom, etc.

A crane mounted on the jack-up unit, or a cantilever on the deck may typically have an operational situation in which they have an outreach outside of a contour of the hull. In particular, such an operational situation can jeopardize the stability of the jack-up unit, when the actual operational condition exceeds the theoretically determined operational plan due to inaccurate pre-load data. So, a more accurate determination of the operational envelope may be relevant for crane or cantilever operations.

By now determining the actual achieved pre-load value on a leg in a structured and objective way, preferably by using an algorithm executable by a computer program, the subjective human judgment of the jacking operator can be made independent of the determination of the actual achieved pre-load. This gives a more reliable pre-load value resulting in more safe operations on the jack-up platform unit. In particular, when using the actual achieved pre-load value to determine the actual crane operations envelope, accurate, reliable and safe crane operations can be done on the jack-up platform unit. As such the jacking operations can be coupled with and integrated to the crane operations, resulting in safer crane operations as the actual margin for the crane operations now can be accurately determined. Similarly, a feed back to the cantilever operations can be done. Thus, the risk on failure of the leg and/or the platform can be obviated when the crane operator operates his crane within the actual determined crane operations envelope. So, instead of the open loop prior art method, in which there is heavily relied upon human judgement, and on theoretically determined operational envelopes, according to the invention not only the pre-load is determined more accurately, but also, this accurately defined pre-load value is fed into the operational envelope. As such, a closed loop method is obtained with more accurate input, resulting in a more reliable operational envelope, and thus safer operations, in which human judgment is minimized.

A leg is considered stable when it is sufficiently settled to the sea bottom, in particular when a leg characteristic is stable during preloading, typically when a leg characteristic difference and/or a gradient of the leg characteristic is smaller than respective predefined thresholds.

A leg characteristic is considered unstable when that the leg characteristic difference and/or gradient of the leg characteristic are larger than respective predefined thresholds. In that case, the leg is considered not to be stable settled to the sea bottom yet.

According to the method, at least one leg is preloaded. For a four legged jack-up platform unit, typically two diagonally opposing legs are preloaded at the same time, while the other two legs are unloaded. During preloading an, preferably as large as possible, load is applied onto the legs. For example, for a 20,000 tonnes jack-up platform unit, applying the total weight onto the two legs would result, theoretically, in a preload of 10,000 tonnes. In practice, this theoretical maximum is never achieved due to friction or other losses, sea bottom characteristics, environmental loads etc. Then, the jacking operator attempts to apply a high load as possible onto the legs. This can be done actively, when the jacking system puts such a high load on the legs to be preloaded. Or, it can be done passively, when the jacking system holds the legs to be preloaded, while the other legs are released, and the weight of the platform hangs on the legs, thus using gravity for preloading. Whichever method is used is not relevant for the achieved pre-load value. The actual load on the leg can be monitored via the jacking system, and can be presented to the jacking operator on his operator interface, but can, additionally or alternatively, be inputted to a control unit. It is observed that the actual load on the legs decreases with time, due to sea bottom settlement, friction, hydraulics etc. According to the method, the actual load on the leg is monitored during a predetermined time interval, e.g. 30 minutes, or 40 minutes. The predetermined time interval can preferably be set by the jack-up platform unit designer, but may be set by the platform unit operator as well. During this predetermined time interval the value of the actual load on the leg is being monitored, preferably by the control unit. It is being monitored whether the load value on said leg remains above a predetermined threshold and whether the gradient of the load value on said leg is smaller than a predetermined limit. Preferably, the control unit is configured to monitor the load value on the leg automatically. The minimum threshold value and the maximum gradient is advantageously provided by the platform unit designer, but may be determined by the jack-up platform unit operator. When the drop in leg load value is higher than a predetermined threshold or when the gradient of the leg load value is too high, then the preloading has to be repeated. The control unit can give an alert signal to the jacking operator that the jacking operator may stop the present preloading and has to redo the preloading of the at least one leg with the same preloading value or with a slightly higher preloading value. By providing an alert signal, visual, auditive or tactile, the operator knows that the preload step failed and that the preload step needs to be repeated either with the same preload value, or with a higher preload value. The control unit can give a suggestion or an indication of the preload value of the subsequent preloading step. The steps of applying a pre-load and monitoring the load value are to be done until the leg is considered to be stable settled to the sea bottom, namely when the drop or decrease in leg load value of the preloaded leg is below a predetermined threshold and the gradient of the load value remains below maximum predefined gradient limit during the predetermined time interval during which the load value is monitored. Then, the actual achieved pre-load value is determined as the minimum reached load value during the predetermined time interval. Preferably, the control unit determines this actual achieved pre-load value. When the actual achieved pre-load value is determined, it can be used to calculate the crane operations envelope of the crane that is mounted on the jack-up platform unit, e.g. around one of the legs. The crane designer provides a crane operations manual in which a crane operations envelope is defined as well. However that crane operations envelope uses the crane as a static item, i.e. a static crane operations envelope, but does not at all take into account that the crane is mounted on a dynamic platform unit of which the foundation is relatively unpredictable or difficult to predict. By now integrating the actual achieved pre-load value with the crane operations envelope, an actual, accurate and reliable crane operations envelope is obtained that takes into account the site specific conditions. For example, after preloading, the loads on the legs can be levelled, equalized or at least they can be settled to an installed load value. The difference between the actual achieved pre-load value and the installed load value, provides for an operational load margin and safety margin. The thus remaining operational load value can be used to integrate with the theoretical crane operations envelope. Depending on hoist load, outreach, slewing angle and/or boom angle, it might be that a specific crane operation may fall within the theoretically determined crane operations envelope, but outside the operational load margin of the jack-up platform unit, thus making the specific crane operation unsafe to perform. As such, an actual crane operations envelope can be determined taking into account the actual achieved pre-load value as well as the actual crane operations. Advantageously, the actual crane operations envelope can be determined in real-time giving the crane operator a real-time and actual insight of a specific crane operation is safe to perform or not. Preferably, this actual crane operations envelope is outputted to a crane operator display that the crane operator has available in its operator cabin. Then, the crane operator can follow in real-time the operations and the operational boundaries of his crane. This can be done in a similar way for determining the actual cantilever operations envelope that can be made available to the cantilever operator, preferably by outputting the cantilever operations envelop to a cantilever operator display that the cantilever operator has available in its operator cabin. The actual cantilever operations envelope may thus differ from the theoretical cantilever operations envelope in that the actual achieved pre-load value is taken into account. The theoretical crane or cantilever operations envelope is typically provided by the engineers designing the crane or cantilever taking into account theoretical values ands safety margins.

The invention further relates to a system for determining an actual crane operations envelope of a crane on a jack-up platform unit.

Another aspect of the invention relates to a computer program product, and/or to a non-transitory signal storage medium storing the computer program product.

Further advantageous embodiments are represented in the subclaims.

The present invention will be further elucidated with reference to a drawing with figures of exemplary embodiments. Corresponding elements are designated with corresponding reference signs. In the drawing shows FIG. 1 a flow scheme of the method according to an aspect of the invention.

It is noted that the figures are given by way of exemplary embodiments and are not to be construed as limiting nor are they to scale.

Figure 1:
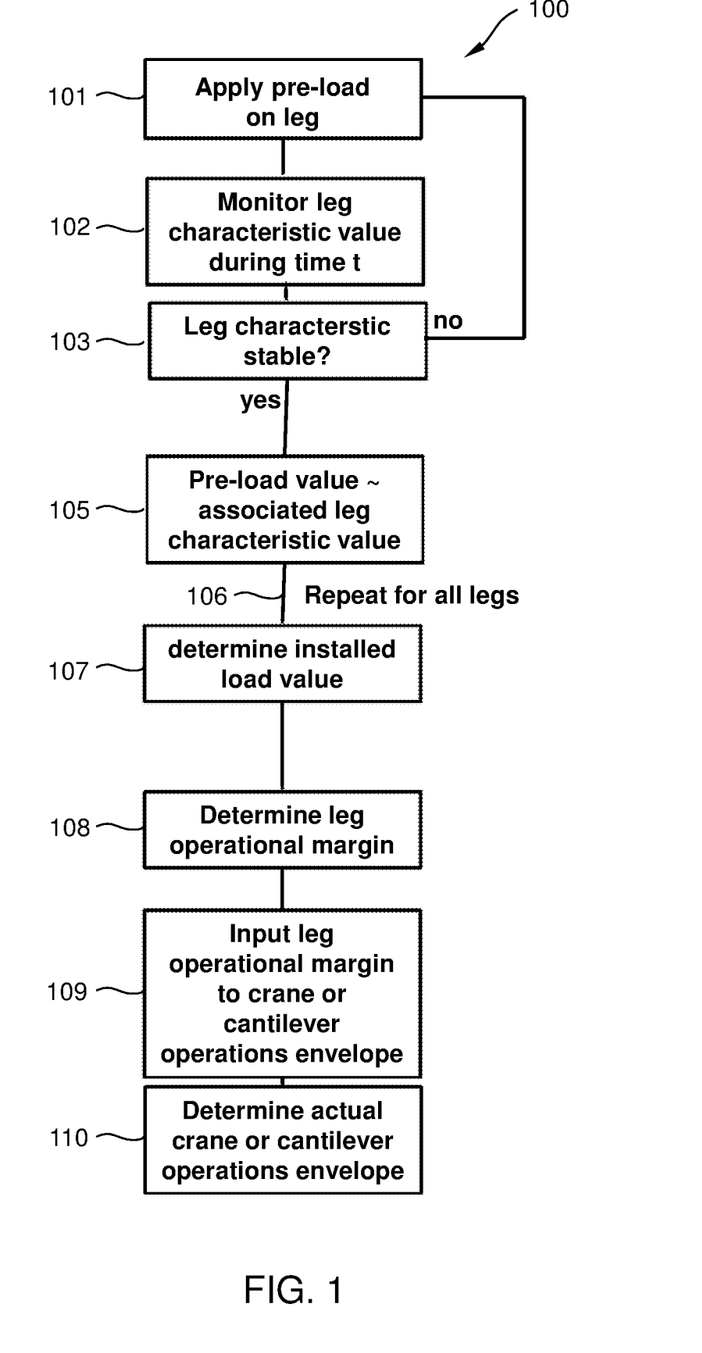

FIG. 1 gives a flow scheme of an embodiment of the method according to the invention. The method 100 not only provides for a more accurate determination of the actual achieved pre-load value on a leg, but also integrates the jacking system data with the crane system data to determine an actual, sometimes even real-time, dynamic crane operations envelope. The method 100 starts with a pre-loading procedure by applying a pre-load on a leg in step 101. For some jack-up platform units, pre-loading is done on two diagonally opposing legs simultaneously. The pre-load is a relatively high load, in some situations a high load as practically possible applied to the leg to settle the leg in the seabed. Pre-loading can be done actively, passively or in a combined active/passive procedure. In step 102, a value of a leg characteristic is monitored during a predetermined time interval t. The leg characteristic can for example be a leg load or a leg penetration. During the time interval t it is then monitored, in step 103, whether the leg characteristic remains stable or not, which is indicative for the stability of the leg, and finally, for the stability of the foundation. Once the leg characteristic is determined stable, the pre-load value can be established, in step 105. The pre-load value is associated with the leg characteristic value that was determined stable. For each leg these steps 101, 102, 103, 105 are repeated, until for each leg the leg characteristic value is determined stable and the associated pre-load value can be established (step 106). When for all legs the actual achieved pre-load values have been determined, the actual load on each of the legs can be determined, in step 107. The actual load is also referred to as the installed load and can only be established when the platform is jacked up to its operational level. After bringing the hull to its operational level, some jacking operators may then attempt to distribute the platform load approximately equally over the legs, other jacking operators may leave the loads as they are. Whichever method is used, after bringing the hull to the operational level, the installed load value for each leg can be determined in step 107. This is the load that is, actually installed, on each of the legs. This actual installed load may thus differ per leg. The step of bringing the hull to its operational condition, in between step 106 and step 107, is not shown in the flow scheme.

This installed load value is smaller than the achieved pre-load value, and simply said, the difference between the achieved pre-load value and the installed load on the leg defines the operational margin of the leg, which is determined in step 108. This operational margin, per leg, can then be inputted to the operational margin of the crane or cantilever operations envelope, in step 109. The actual crane or cantilever operations envelope can then be determined in step 110, with the actual achieved pre-load value and the actual installed load value, thus obtaining an accurate and reliable crane or cantilever operations envelope.

Figure 2:
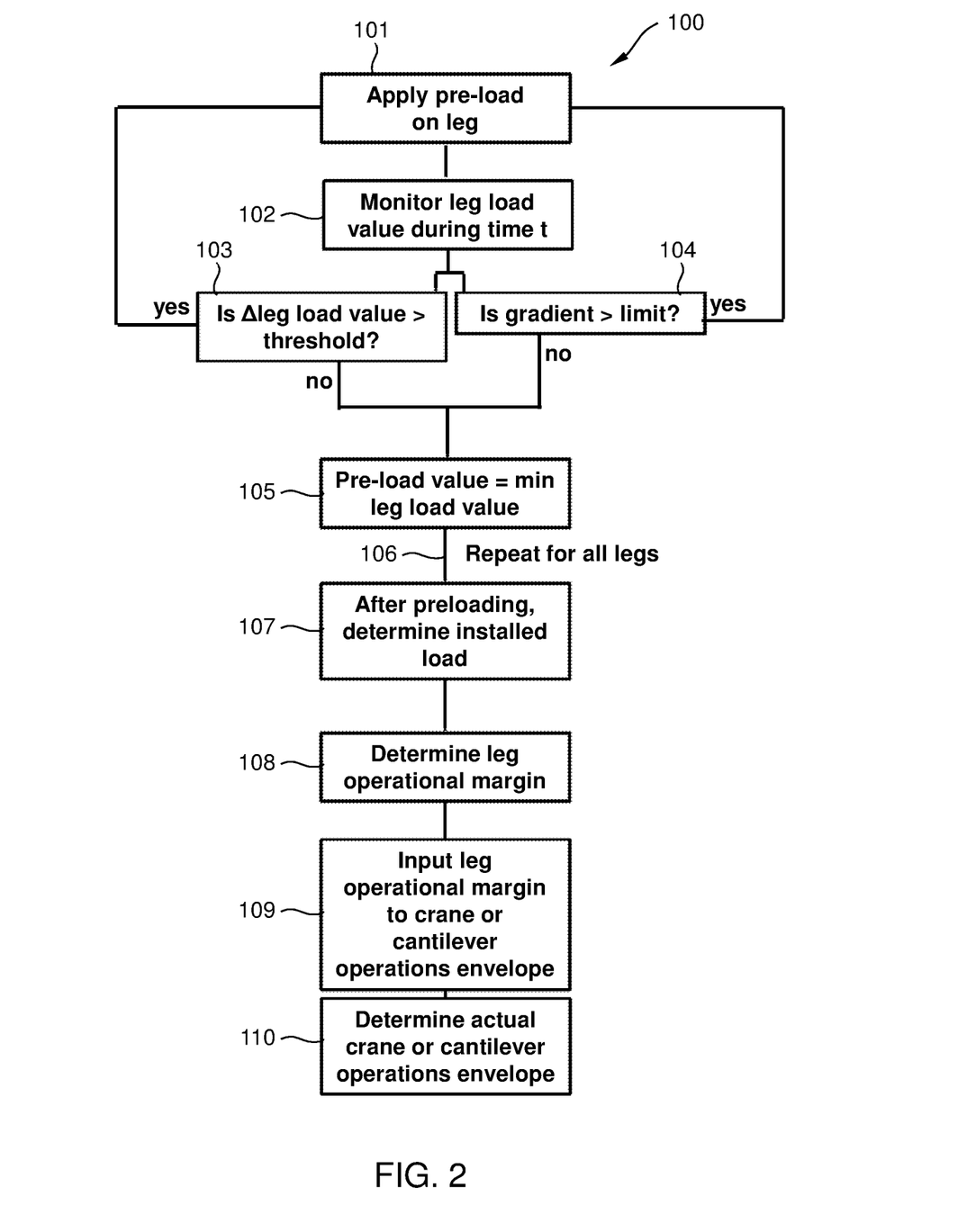
FIG. 2 a flow scheme of the method according to an aspect of the invention using passive pre-loading.
Figure 3:
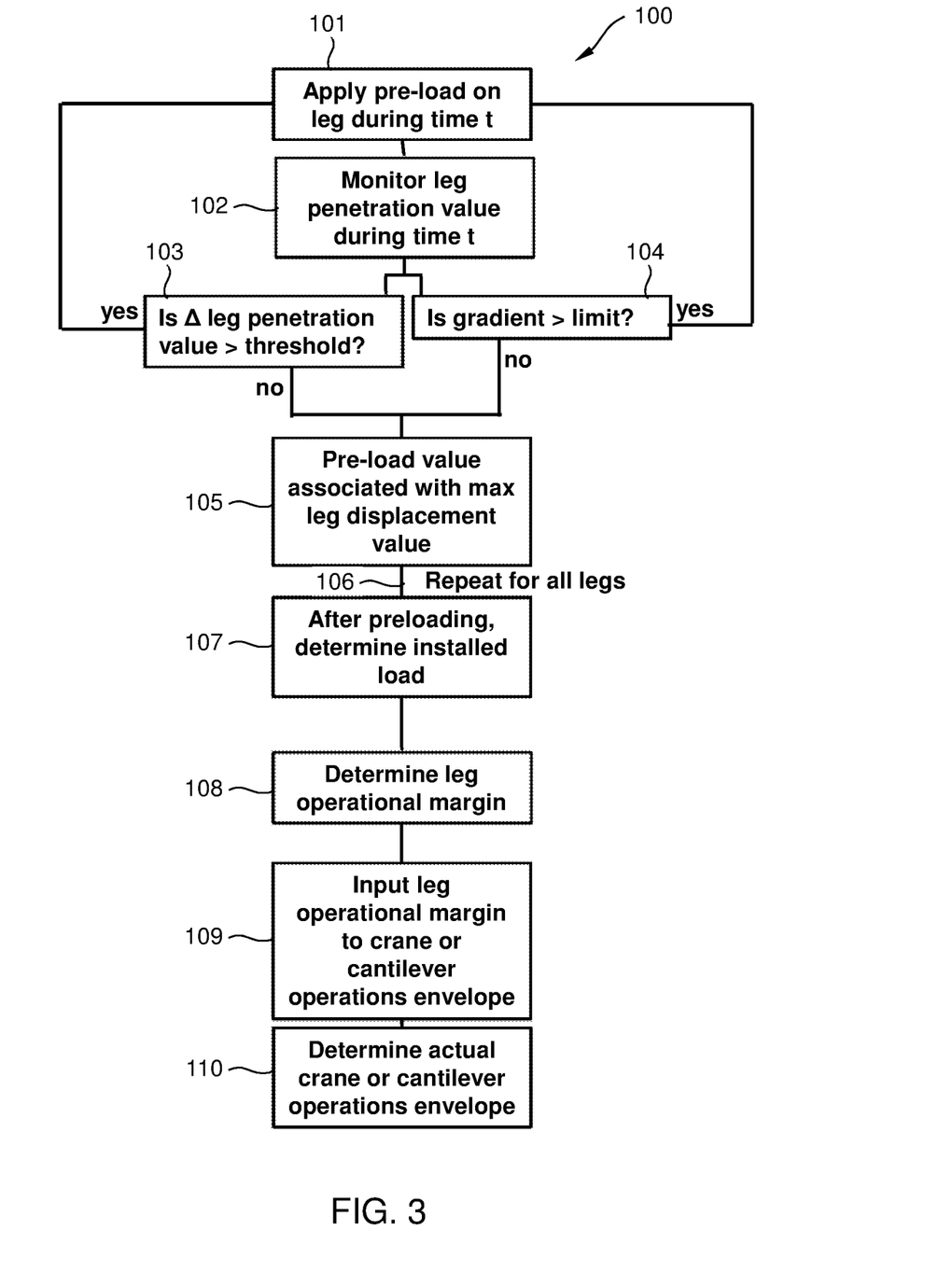
FIG. 3 a flow scheme of the method according to an aspect of the invention using active pre-loading.

FIG. 2 and FIG. 3 show the method of FIG. 1 when using passive pre-loading in FIG. 2, and active pre-loading in FIG. 3. Any mix between active and passive pre-loading is also possible. In FIG. 2, for the passive pre-loading, the leg characteristic that is monitored is the leg load value. In FIG. 3, the leg characteristic that is monitored is the leg penetration value. The methods are largely similar, so FIG. 2 and FIG. 3 will be discussed together.

In step 101, the pre-load is applied, either passively, in that a force is applied in a discrete manner and thereafter the load value is monitored during a predetermined time interval t (step 102 of FIG. 2). Or either, the pre-load is applied actively, in that a force is continuously applied and then held to a constant value. Then, the leg penetration value is monitored in step 102 during a predetermined time interval t (step 102 of FIG. 3).

In step 102 of FIG. 2, the load value of the leg that is being preloaded is monitored during a predetermined time interval, during a time t. The time t can be 20 min, 30 min, or sometimes 50 min and can be set by the jacking system operator and/or by the jack-up platform unit designer. During the time t, it is monitored whether the drop in the leg load value (Δleg load value) is larger than a predefined threshold, question 103, and it is monitored whether the gradient of the decreasing load value (Δleg load value/Δt) is higher than a predefined gradient limit, question 104. The drop in the leg load value is the difference between the leg load value at time t and the leg load value at time 0 at the start of the monitoring time interval. Similarly, in step 103 of FIG. 3, it is checked whether the increase in leg penetration value (Δleg penetration value) is larger than a predefined threshold and whether the gradient of the leg penetration value (Δleg penetration value/Δt) is larger than a predefined limit. If the drop in leg load value is too high, or the increase in leg penetration value is too high, this is an indication of non stable condition. Or, when the gradient of the leg load value or the gradient of the leg penetration value is too high, this is also an indication of a non-stable condition. So, in either situations, there is not a stable condition reached yet, and the pre-loading step is to be repeated, until a stable condition is reached. So, if the response to either one of the questions 103, 104 is "yes", then the preloading can be abandoned and needs to be restarted at step 101.

By monitoring whether the leg characteristic becomes stable, it can be detected when the pre-load value of the leg settles to a certain value. The leg characteristic value, in particular the decrease in the load value or the increase in penetration value, gives an indication of the leg settlement. The gradient or the slope of the decreasing load value or of the increasing leg penetration value gives an indication of the speed of the leg settlement. If the load value on the leg decreases too rapidly, or the leg penetration value increases too rapidly, this is an indication that the leg is not stably settled yet in the sea bottom. The decrease in the load value, or increase in leg penetration, on the leg when the pre-load is applied can be due to sea bottom characteristics, e.g. mud is different than sand or rocks, friction, environmental loads, etc. When the response to both questions 103, 104 is "no", then the leg is stably settled to the sea bottom, and the actual achieved pre-load value can be determined in step 105. The actual achieved pre-load value on the said leg is considered to be the minimum achieved load value during the time t. The actual achieved leg penetration value is related to the actual achieved pre-load and gives indirectly an indication of the actual achieved pre-load. Contrary to the conventional preloading, in which often the applied pre-load is taken as the pre-load value, by using this method now an actual achieved pre-load value can be established per leg. The preloading and the determination of the actual achieved pre-load value is to be done for each leg, or for each pair of legs, until the actual achieved pre-load value is established for each leg of the jack-up platform unit, represented in step 106. After the preloading is finished, some crane operators then may level the platform load over the legs of the platform-unit, also known as equalizing of the load over the legs. This is not strictly necessary anymore with this method. It may happen that one leg remains more heavy loaded than other legs. After preloading and bringing the hull up to its operational level above the sea level, the crane operator may bring an additional torque in the hull by giving additional loading to two diagonally opposing legs. Thus, after preloading, and also after bringing the hull to its operational level, the actual load on each of the legs can be determined, in step 107. This actual load is referred to as the so-called installed load value. Here too, the step of bringing the hull to its operational level, between step 106 and step 107, is not shown. The installed load value is smaller than the achieved pre-load value, and simply said, the difference between the achieved pre-load value and, e.g. the installed leg load value is the operational load margin of the said leg, as will be explained in relation to FIG. 7, and determined in step 108. This operational load margin can be determined based on the installed leg load value after preloading and after jacking the hull to the operational position, advantageously also taking a safety factor into account. In that case, the operational load margin is a static value. Alternatively, the operational load margin can be determined based on the actual measured leg load values, as measured by the jacking system or any other measurement unit on the leg. In that case, the operational load margin is a dynamic value that changes during the operations on the platform-unit. This operational load margin can then be integrated to the crane operations envelope or cantilever operations envelope to come to an integrated crane respectively cantilever operations envelope that takes into account the load that a single leg can take additionally. This is done in step 109. It can be that certain crane operations, with a certain hoist load, outreach, slewing angle and/or boom angle, impose such a high load on a single leg, that the leg load would become higher than the actual achieved pre-load value, thus all the operational load margin is used for that crane operation. Such a crane operation is then not safely possible anymore, although the specific crane operation might in itself be within the static crane operations envelope. The static crane operations envelope are the operating conditions or operating boundaries that are given by the crane designer, usually without taking into account that the crane is mounted on a dynamic foundation, namely a jack-up platform unit. A similar situation is possible for a cantilever operation with a large cantilever extension and/or a heavily loaded cantilever. The jack-up platform unit is, although being stably settled to the sea bottom, nevertheless to be considered a dynamic foundation, as opposed to a static foundation onshore, due to operations going on the platform unit, or wind and/or wave loads or bottom characteristics etc. As such, the actual crane operations envelope, for a specific crane operation using a hoist load, outreach, slewing angle and/or boom angle can be determined in step 110. This gives the crane operator a much more reliable view on what he can do with its crane. Also, preferably, the actual crane operational envelope is adapted in real-time, so when the crane slews e.g. the envelope is adapted and this is presented to the crane operator, so he can then immediately assess whether his operation is still safe. This is an enormous advantage for the crane operator, so he can now during operations monitor and assess the safety of the operation. In the prior art operations, the crane operator does not have an integrated crane operations envelope to which the actual achieved pre-load value is integrated. In a conventional operation, the crane operator might have a pre-load value, which is also not the actual achieved pre-load value but often the applied pre-load value, and the crane operator also does not have any information on the actual leg load. Similarly, the actual cantilever operations envelope can be determined in step 110 taking into account the actual platform conditions, environmental conditions, cantilever outreach and/or cantilever loading, possibly in real-time. This provides an advantage to the cantilever operator as well.

Figure 4:
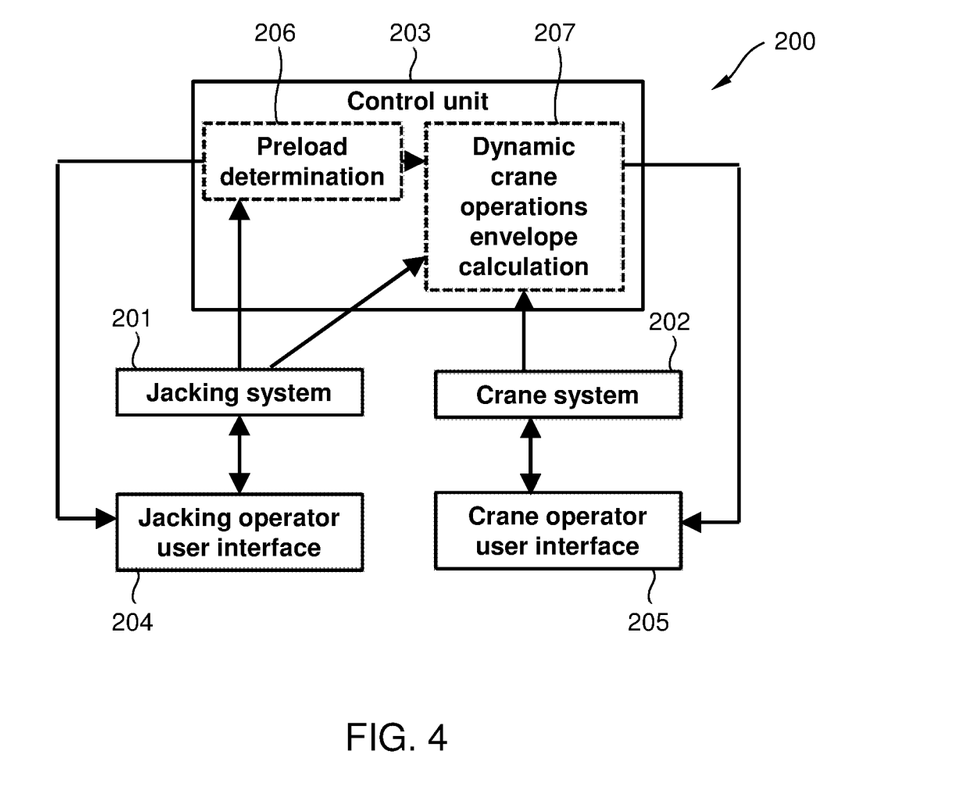
FIG. 4 a schematic representation of a system according to an aspect of the invention.

FIG. 4 schematically shows a system 200 according to the invention, the system 200 comprising a jacking system 201 and a crane system 202 that are in communication with a control unit 203. The jacking system 201 is arranged to jack the associated leg up and down with respect to the hull of the jack-up platform unit and is arranged to hold the leg at a certain position. The jacking system 201 is being operated by a jacking operator that gives input to the jacking system 201 via a jacking operator user interface 204. The jacking system 201 receives input data from the jacking operator user interface 204, but can also provide data, e.g. measured load data to the jacking operator user interface 204. The jacking operator user interface 204 can be a display and/or operating panel via which the operator gives input to the jacking system, e.g. a load to be set. Data from the jacking system 201, e.g. measured load, position of the leg etc. can be presented to the jacking operator on the display of the jacking operator user interface 204. The jacking system 201 can be arranged to measure the load on the leg. Alternatively, a separate load measurement unit on the leg can be provided to determine the actual load on the leg.

The crane system 202 is in communication with the control unit 203 and is being operated by a crane operator from crane operator cabin. The crane operator has a crane operator user interface 205 at its disposal via which he can handle the crane operations. The crane system 202 receives input data from the crane operator user interface 205, but may also provide crane data to the crane operator user interface 205. The crane operator interface 205 may comprise one or more displays on which crane operations data are being displayed, e.g. hoist load, outreach, slewing angle, or boom angle. The crane operator interface 205 may also comprise an operator panel, e.g. comprising one or more joysticks, for providing instructions to the crane system 202.

According to the invention, the control unit 203 is in communication with the jacking system 201, with the jacking operator user interface 204, with the crane system 202 and with the crane operator user interface 205. The control unit 203 receives data from the jacking system 201, in particular measured leg load data. The measured leg load data are inputted to the control unit 203, in particular to a first sub control unit 206 that is configured to determine the actual achieved pre-load value on a leg. The actual achieved pre-load value can, once determined, be fed back to the jacking operator user interface 204. Also, according to the invention, the actual achieved per-load value is inputted to a second sub control unit 207. The second sub control unit 207 is configured to determine the actual or dynamic crane operations envelope. The actual crane operations envelope takes into account the actual achieved preload value to determine the crane operations envelope. By using the actual hoist load and/or outreach and/or slewing angle and/or boom angle and using the actual crane data, an actual crane operations envelope can be obtained. Advantageously, the crane operations envelope can be calculated in real time giving the crane operator a real time envelope on which he can base his crane operations. More advantageously, the actual crane operations envelope is calculated using the actual measured leg load, and as such, the second sub control unit 207 can be in communication with the jacking system 201 as well for receiving the actual measured leg loads. The thus determined crane operations envelope can be fed back to the crane operator, in particular to the crane operator user interface 205 such that the actual crane operations envelope can be displayed to the crane operator.

Figure 5:
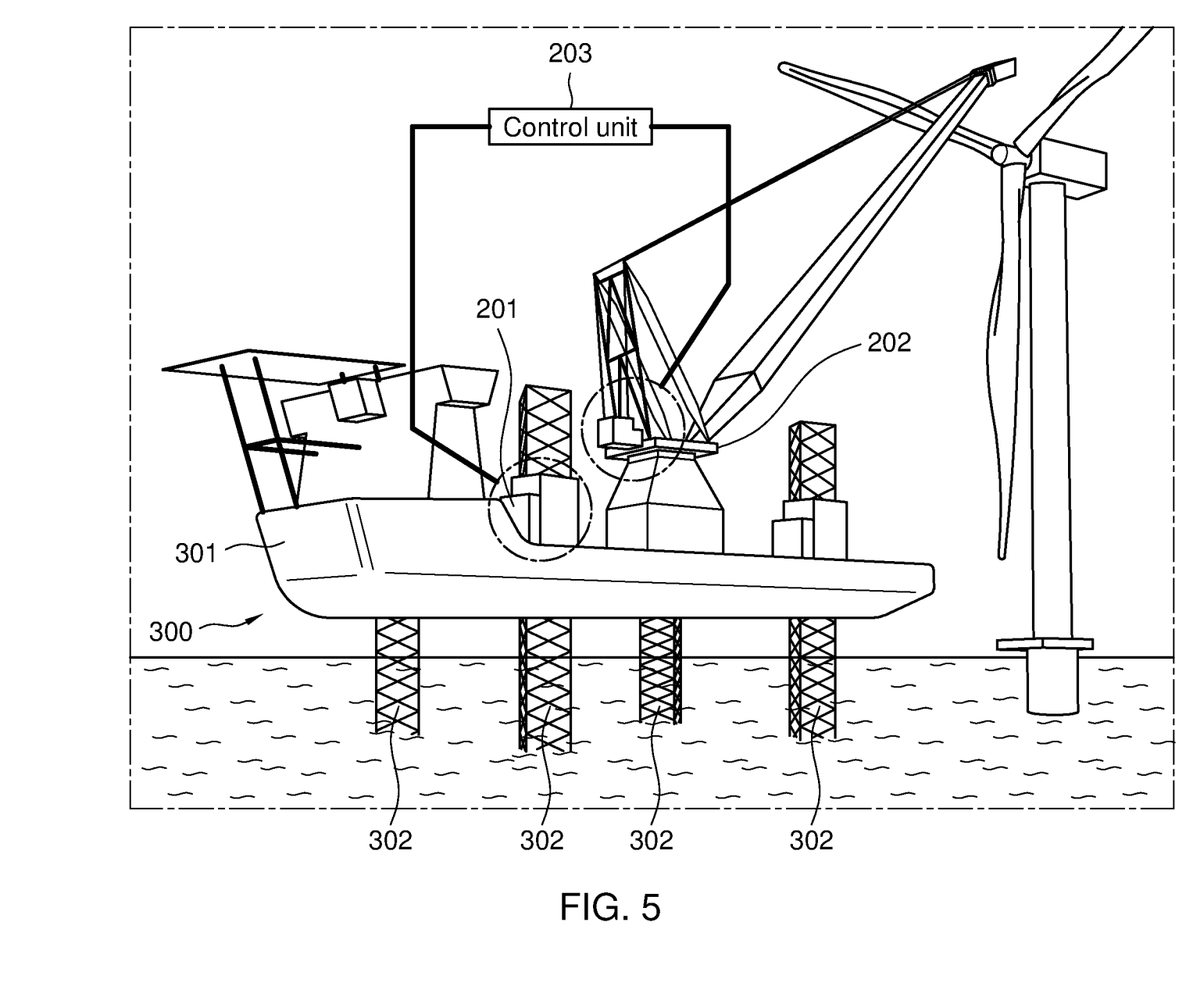
FIG. 5 a schematic view of a jack-up platform unit with a crane mounted around one of its legs.

FIG. 5 schematically shows a jack-up platform unit 300 having a hull 301 and four legs 302. The legs 302 are adjustable with respect to the hull 301. In this figure the jack-up platform unit 300 is shown in the operational condition, with the hull 301 on an operational height above the sea level. The four legs 302 are settled to the sea bed. Each leg 302 is provided with a jacking system 201 to move the leg up and down. The jacking systems 201 are being operated by a jacking operator from a jacking operator cabin having a jacking operator interface. Around one of the legs, a crane 303 is positioned that is arranged for heavy offshore lifting operations, e.g. for wind turbine installation operations. The crane 303 is being operated by a crane operator in a crane operator cabin having a crane operator user interface. As explained above, the jacking system 201 and the crane system 202 are in communication with the control unit 203 to determine the actual crane operations envelope using the actual achieved pre-load value.

Figure 6:
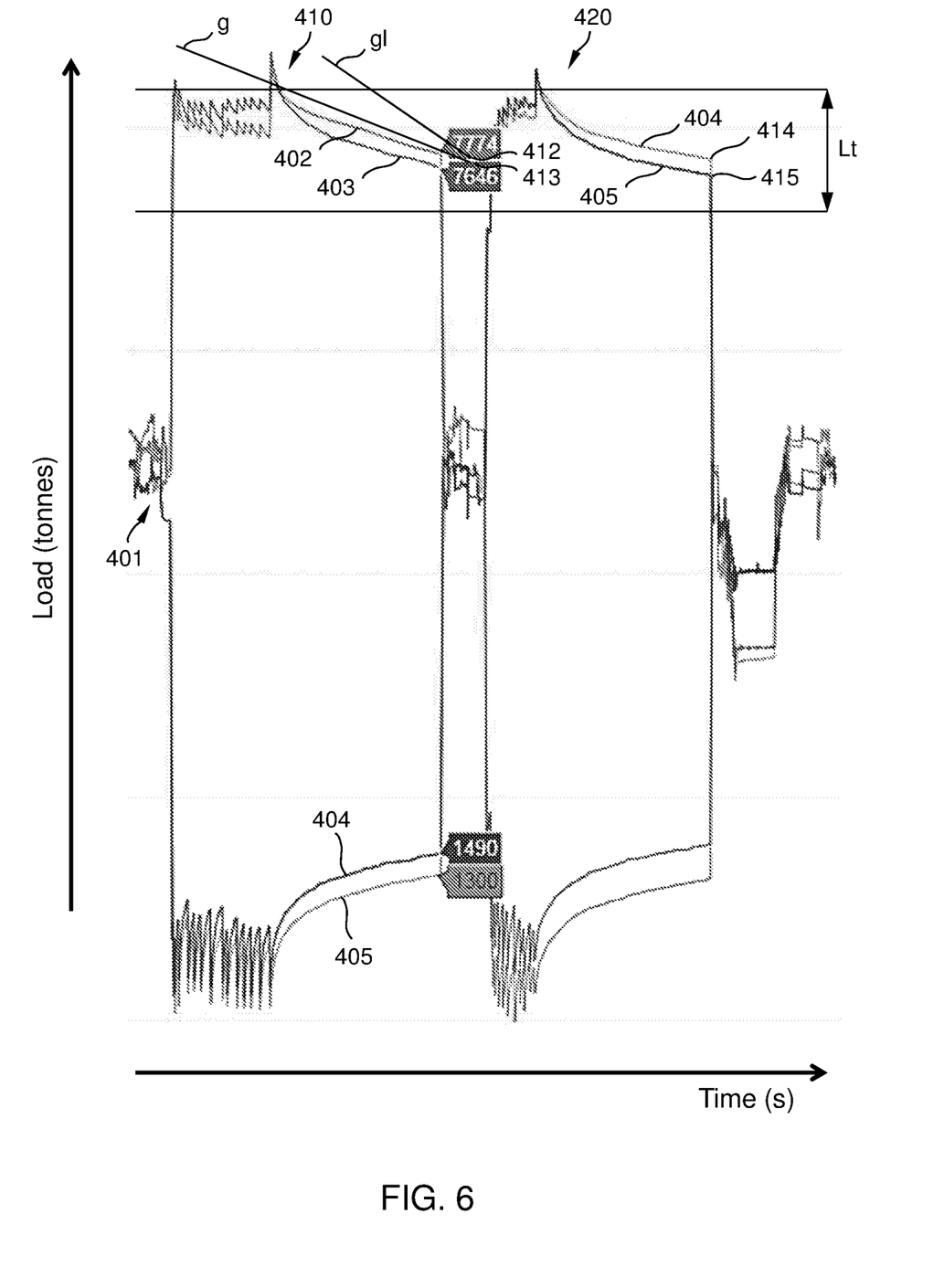
FIG. 6 a representation of a pre-load step.

FIG. 6 schematically shows the measured leg load data during a pre-loading step. Here, a preloading step of a four legged platform unit is represented. From a situation in which the four legs are on the ground, position 401, two diagonally opposing legs are given a high load, the applied pre-load value 410, lines 402 and 403, and the other pair of legs is approximately unloaded. During a predetermined time interval, say 30 minutes, the decrease in measured load value of the legs represented by lines 402, 403 is monitored. It is monitored whether a decrease in the measured leg load stays above the predefined load threshold Lt. Also, it is monitored whether the slope or gradient g of the leg load value lines 402, 403 is smaller than a preset limit gl. Here, in this embodiment, the leg load values of the legs represented by the lines 402, 403 fulfill both requirements, and it can be said that the two legs are stable settled to the sea bottom. The actual achieved pre-load value is then determined as the minimum value of the lines 402, 403, being the load values 412, 413 respectively. Then, the preloading is repeated for the other two legs in the next preloading step by applying a pre-load value 420 to the legs. The measured pre-load slowly decreases as shown by the lines 404, 405. But, when the drop in leg load value is smaller than the predefined threshold and the gradient being smaller than the gradient limit, the minimum achieved value is determined as the actual achieved pre-load values 414, 415.

Figure 7:
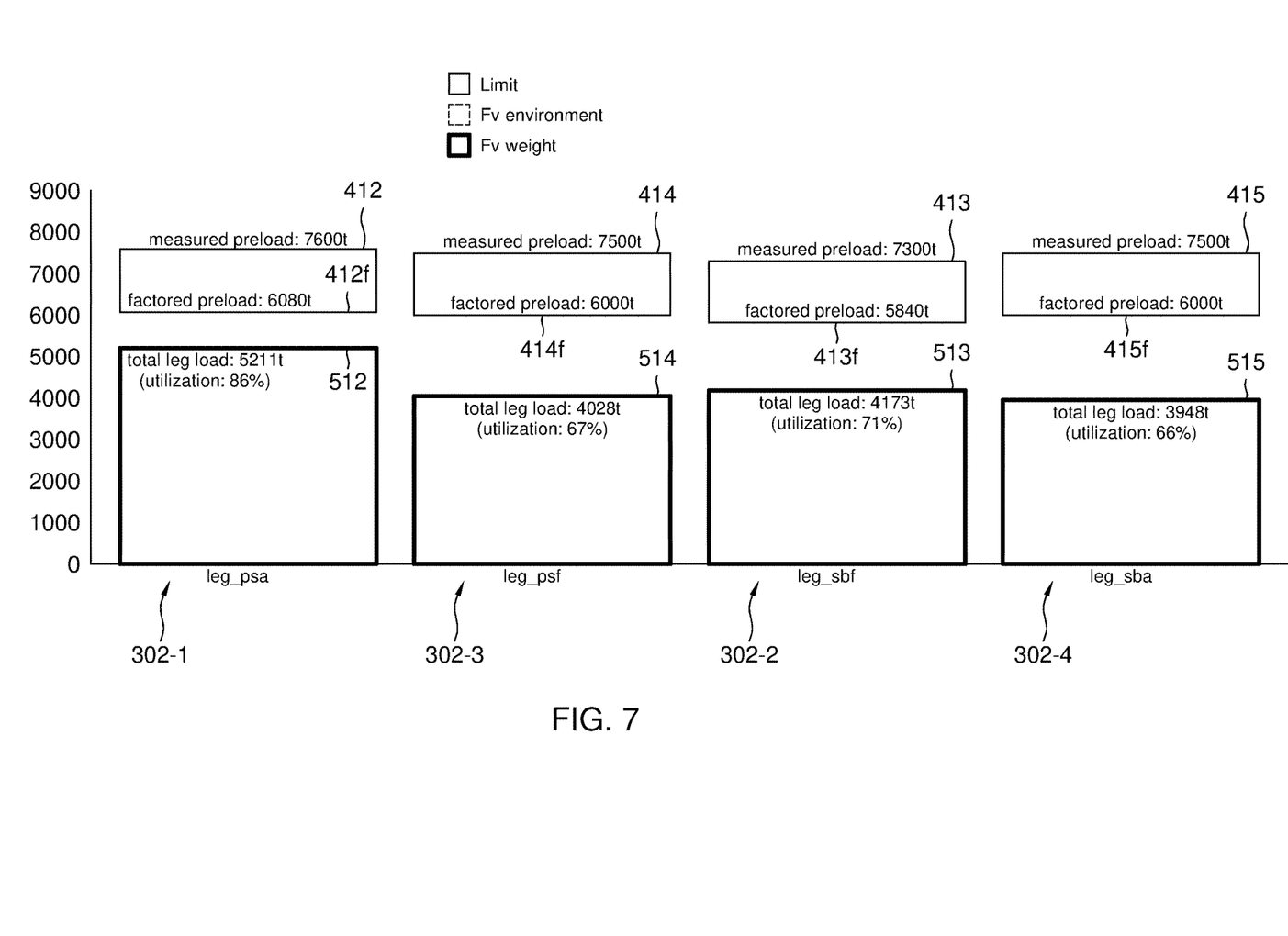
FIG. 7 a schematic representation of leg load values.

With the actual achieved pre-load value determined, the operational margin per leg can be determined. This is represented in FIG. 7 for the four legs 302-1, 302-2, 302-3, 302-4 of a four legged platform unit. The actual achieved pre-load value 412, 414, 413, 415 is the top line per leg. A safety factor is applied to the actual achieved pre-load value resulting in a factored pre-load value 412f, 413f, 414f, 415f. After preloading and after raising the hull to its operational height, the total platform weight is distributed over the four legs, resulting in an installed load value 512, 513, 514, 515 per leg. The difference, or in this figure, the gap between the factored pre-load value and the installed leg load is the operational margin that can be used for operations, such as crane operations on the platform unit. Such a diagram can be calculated by the control unit and can be fed back to the jacking operator, in particular to its jacking operator user interface, so the jacking operator has reliable information on the leg operational margin.

Figure 8A:
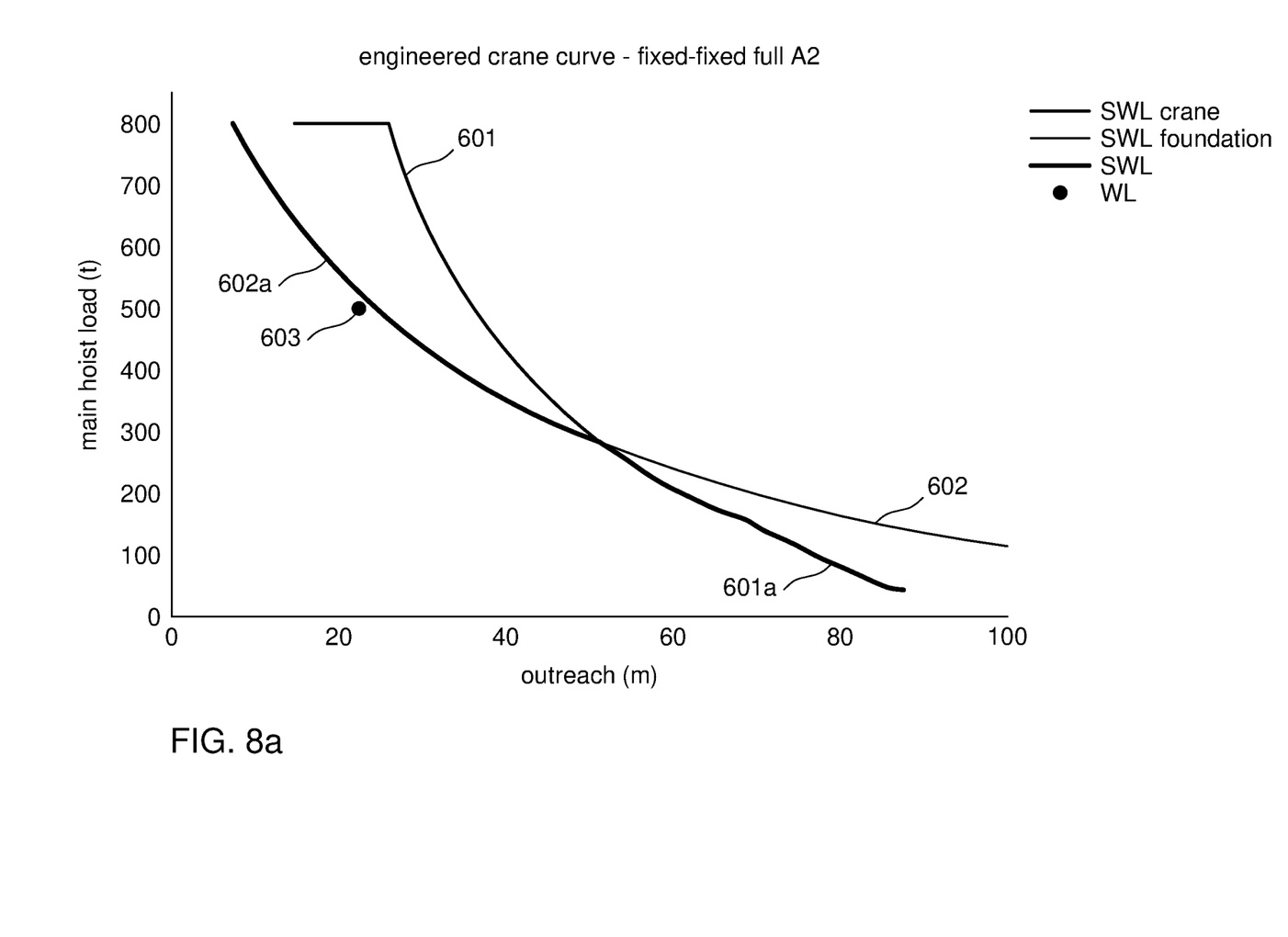
FIG. 8 a schematic representation of a dynamic crane operations envelope.
Figure 8B:
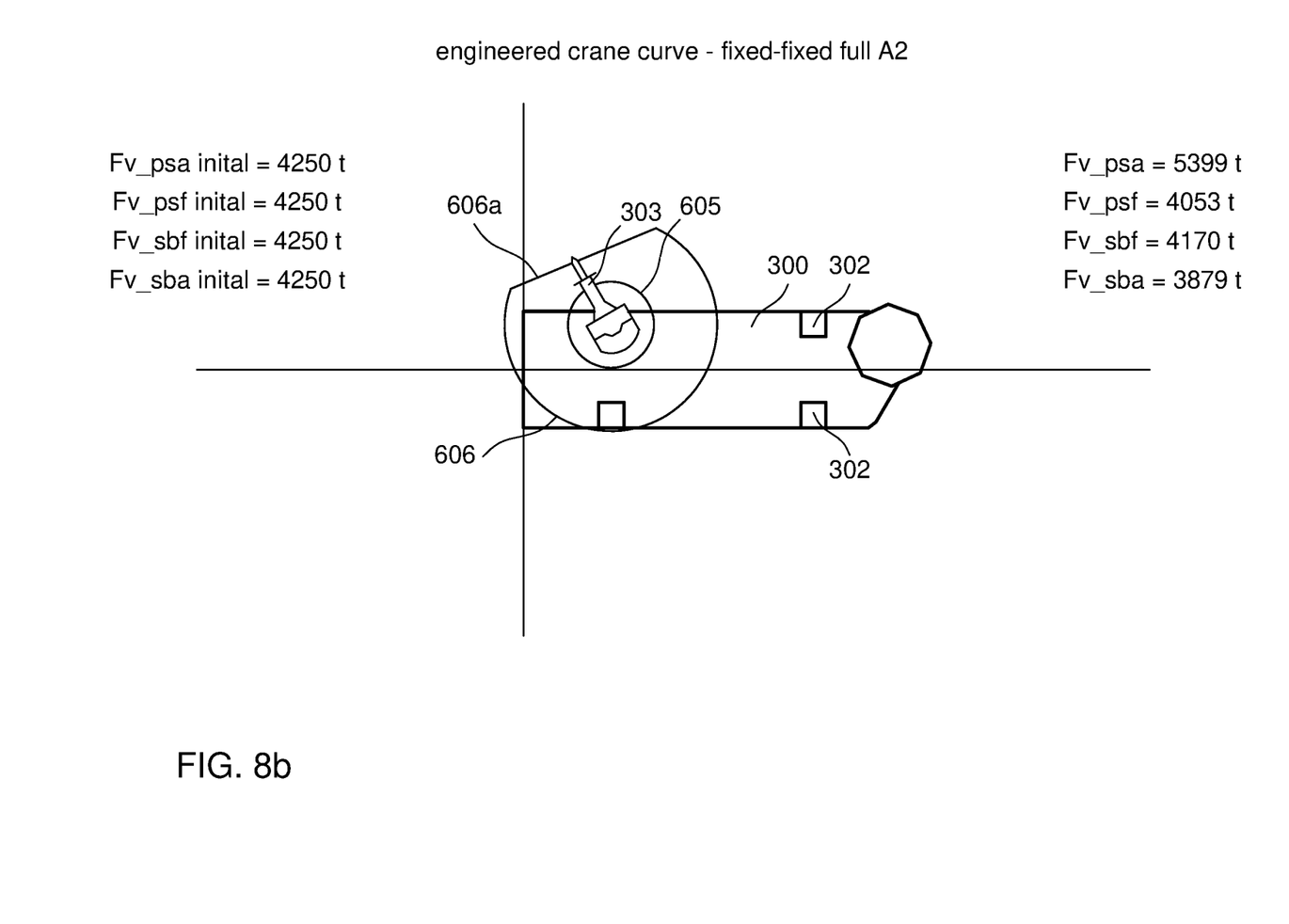

FIG. 8 shows in FIG. 8a a crane operations envelope with the outreach plotted on the horizontal axis and the main hoist load on the vertical axis. In the diagram, the maximum crane safe working load is plotted with line 601. This gives the maximum safe working load of the crane as if the crane was on a static foundation, so without taking into account the dynamic foundation of the crane on the platform unit. Further in the diagram, the foundation safe working load is plotted as line 602. This is in fact the operational margin identified using the actual achieved preload value. In this example, it can be seen that part of the foundation safe working line 602 is below the crane safe working line 601 thus reducing the actual safe crane operations envelope. So, the maximum safe working load of the crane is determined by the part 602a of the foundation safe working load, and by the part 601a by the crane safe working load. The actual working load of the crane is represented by the dot 603. During operations, the dot 603 of the actual crane working load is moving over the diagram. Advantageously, the line 602 is calculated real time using the actual crane data as well as the actual measured leg load. So, when moving the dot 603, the line 602 can be shifted as well. FIG. 8b shows an alternative representation of the crane operations envelope with an outline of the jack-up platform unit 300 with the legs 302 and the crane 303 around one leg. The crane operations envelope is here represented by an inner boundary 605 representing the minimum outreach of the hoist load and by an outer boundary 606. The outer boundary 606 gives the maximum outreach of the hoist load, taking into account the actual achieved pre-load value and the operational leg load margin. In this example it can be seen that part of the outer boundary 606, part 606a, is truncated. This corresponds with the part 602a of FIG. 8a limiting the maximum crane safe working load. The crane operator thus knows that moving the hoist load beyond the outer boundary is not safe for the foundation and for the platform unit. Also these boundaries are calculated real time and presented to the crane operator at the crane operator interface in real time. Thus by combining and integrating the actual achieved pre-load value, the actual measured leg loads and the crane operations envelope, a dynamic and, preferably, real time crane operations envelope is obtained allowing for a more safe and more stable crane operations.

In FIGS. 4-8 the examples of a crane are given, but all is equally applicable for a cantilever and a cantilever operation, where crane is mentioned cantilever can be read. Also, in FIGS. 4-8, the method is explained using a passive pre-loading, but as explained in relation to FIG. 3, the method is equally applicable for active pre-loading or any mix thereof. A method is provided for determining an actual achieved pre-load value by monitoring a leg load characteristic during pre-loading. The method further comprises determining an actual crane or cantilever operations envelope taking into account the actual achieved pre-load instead. The method further comprises taking into account other data such as environmental loads or crane or cantilever movement.

For the purpose of clarity and a concise description features are described herein as part of the same or separate embodiments, however, it will be appreciated that the scope of the invention may include embodiments having combinations of all or some of the features described. In view of this passage it is evident to the skilled reader that the variants of the claims as filed may be combined with other features described in the application as filed, in particular with features disclosed in the dependent claims. It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the invention defined in the following claims.

The invention claimed is:

1. A method for determining a crane or cantilever operations envelope of a crane or cantilever mounted on a jack-up platform unit, the method comprising:
  applying a pre-load to at least one leg of the jack-up platform unit;
  monitoring at least one characteristic of said at least one leg to which the pre-load has been applied, during a predetermined time interval;
  monitoring the leg characteristic and/or a gradient of the leg characteristic during said time interval;
  evaluate whether the leg characteristic is stable during said time interval;
  repeating the above steps until during said time interval the leg characteristic is stable whereby the leg characteristic remains within the predetermined threshold and the gradient of the leg characteristic remains within the predetermined limit; wherein the value of the actual achieved pre-load is the leg load value associated with the thus achieved stable leg characteristic;
  determining an actual crane or cantilever operations envelope by calculating, per leg, the leg load capacity based on the actual achieved pre-load value and translating the calculated leg load capacity to a crane or cantilever operations capacity.

2. The method according to claim 1, further determining the crane or cantilever operations capacity as a function of at least crane or cantilever movement and/or crane or cantilever loading and/or environmental loading.

3. The method according to claim 1, wherein evaluating whether the leg characteristic is stable comprises evaluating the difference of the leg characteristic value in relation to a predetermined threshold and/or evaluating the gradient of the leg characteristic in relation to a predetermined limit.

4. The method according to claim 1, wherein evaluating whether the leg characteristic is stable, when the leg characteristic is a leg load value, comprises evaluating whether the decrease of the leg load value on said leg remains below a predetermined threshold and whether the gradient of the leg load value on said leg is smaller than a predetermined limit.

5. The method according to claim 1, wherein evaluating whether the leg characteristic is stable, when the leg characteristic is a leg penetration value, comprises evaluating whether the increase in leg penetration value remains below a predetermined threshold and whether the gradient of the leg penetration value of said leg is smaller than a predetermined limit.

6. The method according to claim 1, further comprising:
providing an alert signal when the monitored leg characteristic value of said leg is evaluated as unstable in that the leg characteristic difference and/or gradient of the leg characteristic are larger than respective predefined thresholds.

7. The method according to claim 1, wherein, determining the actual crane or cantilever operations envelope is done in real-time using the actual crane or cantilever parameters such as hoist load and/or crane outreach and/or slewing angle and/or boom angle, and/or cantilever outreach.

8. The method according to claim 1, further comprising:
providing a control unit that is configured to receive the monitored value of the leg characteristic of said leg during a predetermined time interval and that is configured to monitor during said time interval whether the leg characteristic is stable.

9. A computer program product comprising software encoding instructions that, when executed on one or more processing engines, perform the method of claim 1.

10. A non-transitory computer readable signal storage medium storing the computer program product of claim 9.

11. The method of claim 1, wherein the at least one characteristic of said leg is a leg load value and/or a leg penetration value.

12. The method of claim 8, wherein the control unit is configured to provide an alert signal when the leg characteristic of said leg is evaluated as unstable.

13. The method of claim 8, wherein the control unit is configured to determine an actual crane or cantilever operations envelope by calculating, per leg, the leg load capacity based on the achieved pre-load value and translating the calculated leg load capacity to a crane or cantilever operations capacity as a function function of crane or cantilever parameters.

14. The method of claim 13, wherein the crane or cantilever parameters include one or more of hoist load, crane outreach, slewing angle, boom angle, and cantilever outreach.

15. A system for determining an actual crane or cantilever operations envelope of a crane or cantilever on a jack-up platform unit comprising:
a jack-up system arranged for moving an associated leg with respect to a hull of the jack-up platform unit and for applying a load on the leg;
a control unit configured to monitor a characteristic value of the leg during a predetermined time interval of applying the load, to determine whether the characteristic value remains stable,
wherein the control unit is further configured to determine the actual crane or cantilever operations envelope by calculating, per leg, a leg load capacity based on said load being associated with the characteristic having been determined to be stable during the predetermined time interval, and translating the leg load capacity to a crane or cantilever operations capacity.

16. The system according to claim 15, further comprising a crane operator display arranged to receive actual crane operations envelope data from the control unit and/or a cantilever operator display arranged to receive actual cantilever operations envelope data from the control unit.

17. The system of claim 15, wherein, according to the control unit that is configured to determine whether the characteristic value remains stable, the characteristic value is considered unstable when a leg characteristic difference and/or a leg characteristic gradient is larger than a respective predefined threshold.

* * * * *

UNITED STATES PATENT AND TRADEMARK OFFICE
CERTIFICATE OF CORRECTION

| | | |
|---|---|---|
| PATENT NO. | : 12,270,169 B2 | Page 1 of 1 |
| APPLICATION NO. | : 17/690620 | |
| DATED | : April 8, 2025 | |
| INVENTOR(S) | : Vanderheggen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 260 days.

Signed and Sealed this
Sixteenth Day of December, 2025

John A. Squires
*Director of the United States Patent and Trademark Office*